US008327444B2

(12) United States Patent
Shea

(10) Patent No.: US 8,327,444 B2
(45) Date of Patent: Dec. 4, 2012

(54) SUSPICIOUS AUTONOMOUS SYSTEM PATH DETECTION

(75) Inventor: Ryan Shea, Sterling, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 868 days.

(21) Appl. No.: 12/422,408

(22) Filed: Apr. 13, 2009

(65) Prior Publication Data
US 2010/0263041 A1  Oct. 14, 2010

(51) Int. Cl.
G06F 12/14 (2006.01)
G06F 15/177 (2006.01)
G08B 23/00 (2006.01)

(52) U.S. Cl. ............. 726/23; 709/224; 709/238; 726/25
(58) Field of Classification Search .................. None
See application file for complete search history.

(56) References Cited

U.S. PATENT DOCUMENTS

| 7,023,808 | B2* | 4/2006 | Ball et al. ............... 370/238 |
| 2002/0078202 | A1* | 6/2002 | Ando et al. ............... 709/225 |
| 2008/0028467 | A1* | 1/2008 | Kommareddy et al. ........ 726/23 |
| 2010/0132039 | A1* | 5/2010 | Ji et al. ............... 726/23 |

OTHER PUBLICATIONS

Kevin Butler and Patrick McDaniel SIIS Laboratory Computer Science and Engineering, The Pennsylvania State University, University Park, PA USA, CCS 06 Oct. 30-Nov. 3, 2006 ACM 1-59593-518-5/06/0010.*
Hepner, Clint, et al., "Defending Against BGP Main-In-The-Middle Attacks", Feb. 2009, www.blackhat.com/presentations/bh-dc-09/Zmijewski/BlackHat-DC-09-Zmijewski-Defend-BGP-MITM.pdf, (76 pages).
Pilosov, Alex, et al., "Stealing the Internet—An Internet-Scale Man in the Middle Attack", Defcon 16, Las Vegas, NV—Aug. 10, 2008, Blog.wired.com/27bstroke6/files/edited-iphd-2.ppt, (31 pages).

* cited by examiner

Primary Examiner — Philip Chea
Assistant Examiner — Fatoumata Traore

(57) ABSTRACT

A system includes a memory to store instructions and an autonomous system path (AS-path) and a processor. The processor executes instructions in the memory to determine an origin degree for each autonomous system in the AS-path, compare the origin degree of a first adjacent autonomous system in the AS-path with each subsequent autonomous system in the AS-path, and sum percentage increase values determined by comparing the origin degree of the first adjacent autonomous system in the AS-path with each subsequent autonomous system in the AS-path to determine a suspicion score for the AS-path.

20 Claims, 7 Drawing Sheets

SUSPICIOUS AUTONOMOUS SYSTEM PATH DETECTION

BACKGROUND INFORMATION

Border Gateway Protocol (BGP) can be used to connect together a network of autonomous systems (AS). Each autonomous system needs at least one router (sometimes referred to as a "BGP speaker") that is able to run BGP and is able to connect to at least one BGP router in other autonomous system. To adequately analyze traffic traversing a data network, it is important to be able to determine the AS-path from the source network to the destination network, and the entry and exit routers within a data network.

Data transiting over a network of autonomous systems (AS) may be compromised by AS-path forgeries. One such approach, commonly referred to as a man-in-the-middle (MITM) attack involves misdirecting specific Internet traffic via carefully constructed BGP routing messages. Using this approach, an attacker can redirect incoming traffic of a victim through the attacker's autonomous system for inspection or alteration before ultimately passing it on to the victim. The MITM attack relies on the attacker winning a best path selection process in BGP routing. For example, MITM may announce a more specific network prefix than a network prefix announced by the victim. Since BGP policy typically defaults to the route with the most specific prefix, the attacker can receive all traffic intended for that more specific network prefix, rather than the rightful owner (i.e., the victim). In a successful MITM attack, the misdirected traffic may then be transparently passed to the victim by creating a viable path from the attacker's autonomous system to the victim.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide an automated method of discovering suspicious and/or unlikely Border Gateway Protocol (BGP) paths within and outside of an Internet service provider's (ISP's) Internet backbone. Using backbone BGP data collected from either a BGP speaker internal to an autonomous system (AS) and/or through externally aggregated BGP data, unlikely AS-paths may be determined through a comparative analysis of the connectedness of each autonomous system number (ASN) in a particular path. In one implementation, the connectedness of each hop (or some hops) in an AS-path may be scored and aggregated to determine a suspicion score for the AS-path. Thus, implementations described herein may provide a way to discover BGP hijacking activity (e.g., AS-path forgery man-in-the-middle attacks) and/or mistaken AS-path announcements by service providers or customers.

As used herein, the terms "autonomous system," "Internet service provider (ISP)," or "data network," may refer interchangeably to a collection of connected routing prefixes under the control of one or more network operators that operates under a unique ASN. Also, the term "autonomous system number (ASN)" may be broadly construed to mean a particular autonomous system or number of autonomous systems.

Figure 1:
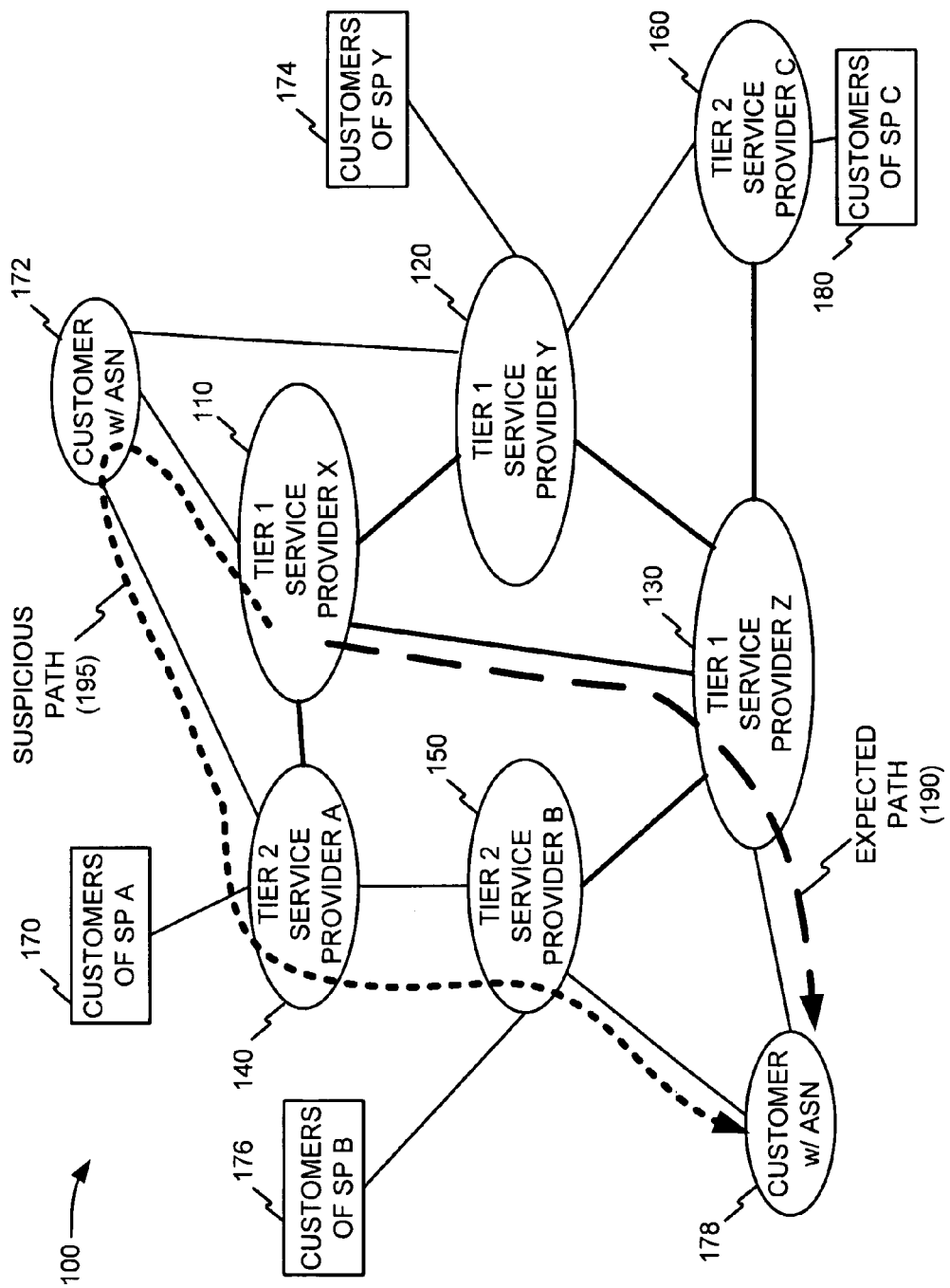
FIG. 1 illustrates an exemplary network in which systems and/or methods described herein may be implemented.

FIG. 1 illustrates an exemplary network 100 in which systems and/or methods described herein may be implemented. As shown in FIG. 1, network 100 may include tier one Internet service providers (ISPs) 110, 120, and 130, tier two ISPs 140, 150, 160, and customers 170-180.

For simplicity, three tier one ISPs 110-130, three tier two ISPs 140-160, and six customers 170-180 have been illustrated in FIG. 1. In practice, there may be more tier one ISPs, tier two ISPs, and/or customers. Also, in some instances, one or more of the components of network 100 may perform one or more functions described as being performed by another one or more of the components of network 100.

Each ISP, whether it is a tier one ISP or a tier two ISP, must have its own ASN to support BGP routing. Customers of the ISPs (e.g., customers 170-180) may or may not have their own ASNs. If the customers do not have their own ASNs, they may be considered part of the autonomous system of their associated ISP.

Tier one ISPs 110-130 may be large national ISPs. Generally, all tier one ISPs may exchange traffic with each other directly, which may be referred to as "peering." Every tier one ISP may typically peer with every other tier one ISP as part of a mutually beneficial exchange. Thus, a tier one ISP may typically not pay for data transit service across another tier one ISP.

Tier two ISPs 140-160 may be regional ISPs or smaller ISPs that rely on a tier one ISP (e.g., one or more of tier one ISPs 110, 120, and 130) and/or another tier two ISP to provide transit service. Tier two ISPs 140-160 may generally be connected to one or more tier one ISPs. Tier two ISPs typically establish a customer relationship to pay for transit services from a tier one ISP, due at least in part to the fact that the size difference between a tier two ISP and a tier one ISP preclude a mutually beneficial exchange (e.g., peering) based on data transit activity alone.

Customers 172 and 178 may represent customers with their own ASN. Unlike other customers (e.g., customers 170, 174, 176, and 180), customers 172 and 178 may be used to provide transit in network 100. Thus, customers 172 and 178 may function similar to a tier two ISP described above.

Each autonomous system (e.g., tier one ISPs, tier two ISPs, and/or any customer that has its own ASN) may function independently from the other autonomous systems, but they may choose to cooperate with each other to deliver data. Different autonomous systems may cooperate with each other by exchanging routing information using external gateway protocols such as the Border Gateway Protocol (BGP). Within each autonomous system, internal gateway protocols, such as the Open Shortest Path First (OSPF) protocol, may be used.

Data originating from a source network may need to travel through multiple autonomous systems before arriving at the destination network. For example, traffic originated from customer 170 and destined to customer 178 may travel through ISP 140, ISP 110 and ISP 130. In other words, traffic passing through a data network, ISP 110 for example, may come from a source network more than one autonomous system away and may end up in a destination network several autonomous systems away.

If network 100 uses BGP, BGP will choose a best path (e.g., select a winning path of multiple possible paths) based on a hierarchy of BGP policies, such as a preference for lower multi-exit discriminators (MEDs, e.g., an arbitrary metric assigned to a route to determine the exit point to a destination when all other factors are equal), a preference for peers, etc. The most specific route for a destination is selected from the routing table which consists of, in part, BGP best paths. Assume, for example, in FIG. 1 that customer 178 represents a potential victim and customer 172 represents an attacker (e.g., customer 172 seeks unauthorized access to data traffic intended for customer 178). Typical traffic flow from a particular source (not shown), may flow along expected path 190 from tier one ISP 110 through tier one ISP 130 to customer 178. However, if customer 172 (i.e., the attacker), announces a more specific network prefix for customer 178 than the network prefix actually announced by customer 178, customer 172 may win the BGP path selection and can receive all traffic intended for that more specific network prefix. Customer 172 may then pass the misdirected traffic to customer 178 along an alternate viable path, shown in FIG. 1 as suspicious path 195.

In implementations described herein, an ISP, such as ISP 110, may include an analysis server to collect AS-path information from entry/exit routers (i.e., BGP speakers) and/or other sources and to identify potentially hijacked AS-paths transiting the ISP backbone, such as suspicious path 195. As described in more detail herein, unlikely AS-paths may be identified through a comparative analysis of the connectedness of each ASN in an AS-path.

Figure 2:
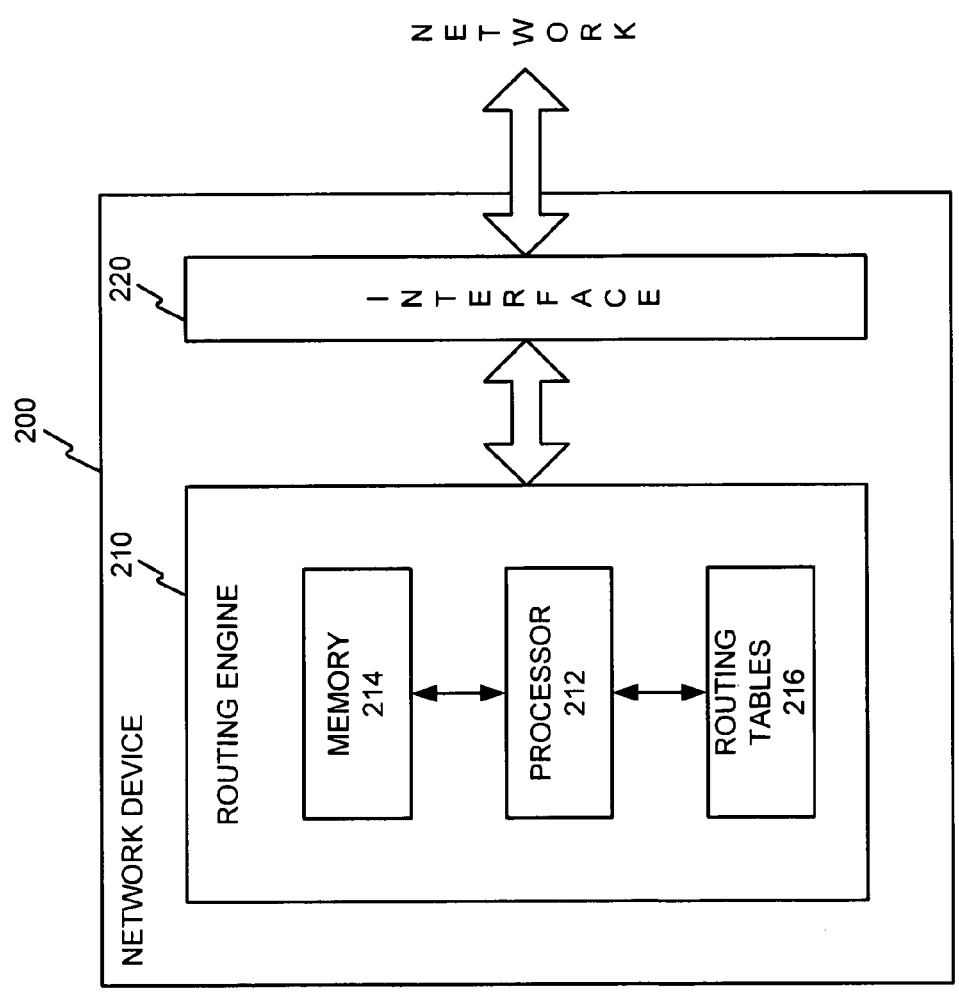
FIG. 2 illustrates an exemplary network device consistent with implementations described herein.

FIG. 2 illustrates an exemplary network device 200 consistent with implementations described herein. Network device 200 may be, for example, an entry router and/or an exit router for an AS, such as ISP 110. Network device 200 may include a routing engine 210 (e.g., that includes a processor 212, memory 214, and one or more routing tables 216) and an interface 220.

Processor 212 may include a processor, microprocessor, or other type of processing logic, such as an application-specific integrated circuit (ASIC), a field-programmable gate array (FPGA), etc., that may interpret and execute instructions. Processor 212 may determine the path on which a received packet is to be routed through a network, such as network 100, toward its ultimate destination based on information contained in memory 214 and routing tables 216.

Memory 214 may include a random access memory (RAM), a read only memory (ROM) device, a magnetic and/or optical recording medium and its corresponding drive, and/or another type of static and/or dynamic storage device that may store information and instructions for execution by processor 212. Memory 214 stores information that aids in the routing of packets and the identification of alternate paths. In one implementation, memory 214 may include one or more conventional databases, such as a Link State Database, a PATHS Database, and a Forwarding Database.

Routing tables 216 may include a static and/or dynamic storage device that may store tables for network device 200. In one implementation, routing tables 216 may include a BGP routing table.

Communication interface 220 may include an interface that provides a physical connection between routing engine 210 and network 100. A single communication interface 220 is illustrated for clarity. A particular network device 200 may, in practice, include multiple interfaces 220 coupled to multiple networks. Moreover, a particular network device 200 may include additional devices (not shown) that aid in the receiving, transmitting, and processing of information received at network device 200.

Network device 200 may perform certain operations, as described in detail below. Network device 200 may perform these operations in response to processor 212 executing software instructions contained in a computer-readable medium, such as memory 214. A computer-readable medium may be defined as a physical or logical memory device. A logical memory device may include memory space within a single physical memory device or spread across multiple physical memory devices.

The software instructions may be read into memory 214 from another computer-readable medium, such as a data storage device, or from another device via communication interface 220. The software instructions contained in memory 214 may cause processor 212 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 200, in other implementations, network device 200 may contain fewer, different, differently arranged, and/or additional components than depicted in FIG. 2. In still other implementations, one or more components of network device 200 may perform one or more of the tasks described below as performed by one or more other components of network device 200.

Figure 3:
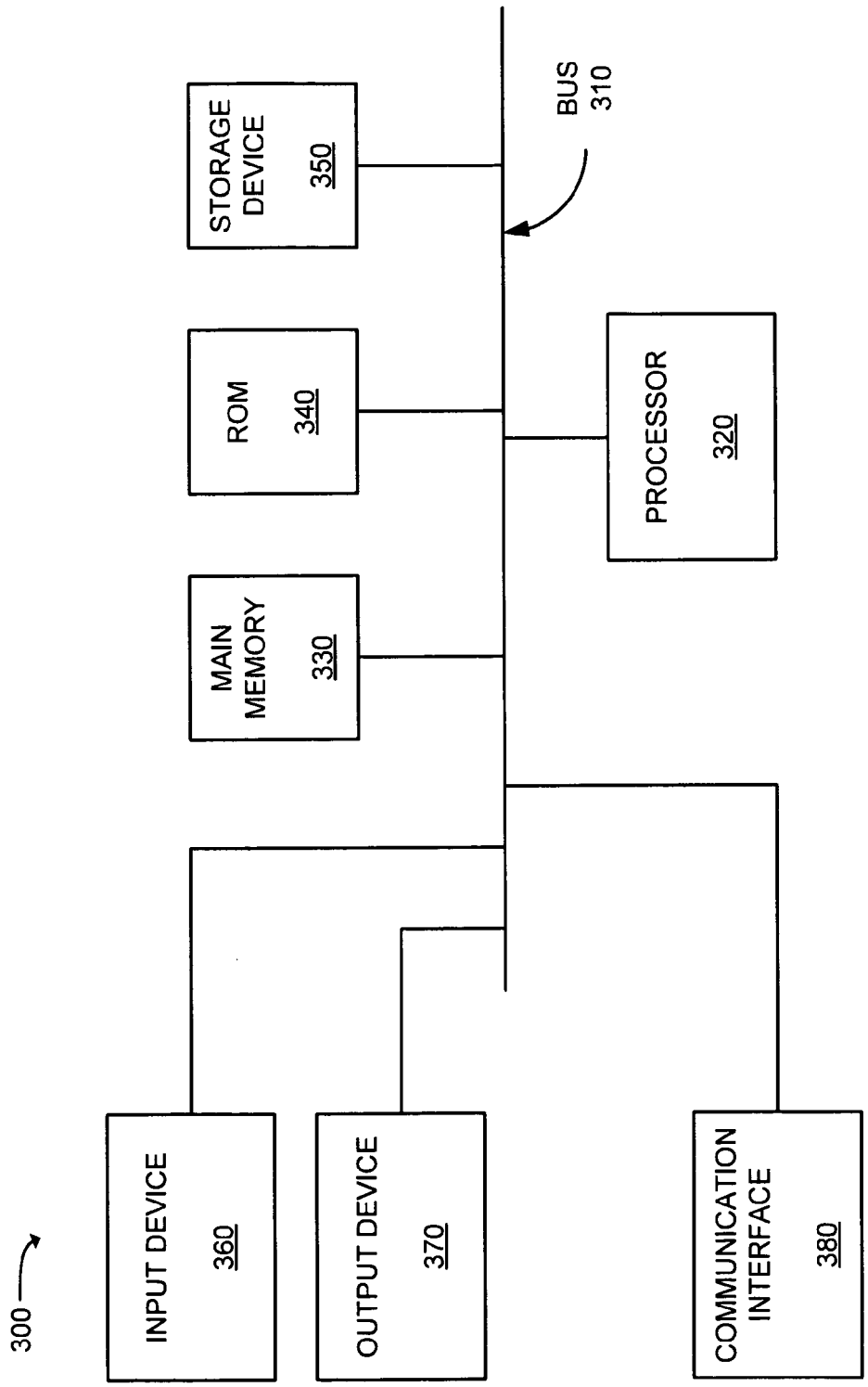
FIG. 3 is a diagram of exemplary components of an analysis server that may correspond to an analysis server for an Internet service provider.

FIG. 3 is a diagram of exemplary components of an analysis server 300 that may correspond to an analysis server for an ISP, such as ISP 110. Analysis server 300 may include one or more server entities that are capable of performing statistical analysis on data retrieved from, for example, network device 200. In one implementation, analysis server 300 may perform a comparative analysis to identify unlikely AS-paths based on the connectedness of each ASN in the AS-path. Connectedness of an ASN may be used as a projection for the size of the ASN to identify atypical AS-path routing. Connectedness may be determined in a number of ways, including BGP table entries, directly connected neighbors, percentage of total AS-paths the ASN appears in, or the total size of all advertised prefixes. In one particular implementation, described further herein with respect to FIG. 5, connectedness may be determined based on the origin degree of ASNs in an AS-path.

As illustrated in FIG. 3, analysis server 300 may include a bus 310, a processor 320, a main memory 330, a ROM 340, a storage device 350, an input device 360, an output device 370, and a communication interface 380.

Bus 310 may include a path that permits communication among the components of device 300. Processor 320 may include a processor, microprocessor, or other type of processing logic, such as an ASIC, a FPGA, etc., that may interpret and execute instructions.

Main memory 330 may include a RAM or another type of dynamic storage device that stores information and instructions for execution by processor 320. ROM 340 may include a ROM device or another type of static storage device that may store static information and instructions for use by processor 320. Storage device 350 may include a magnetic and/or optical recording medium and its corresponding drive. In one implementation, storage device 350 may include a database integrated with and/or remotely connected to analysis server 300. In an exemplary implementation, storage device 350 may store BGP routing table information that may be analyzed to determine connectedness of one or more AS-paths.

Input device 360 may include a mechanism that permits an operator to input information to analysis server 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems, such as network device 200.

As will be described in detail below, analysis server 300 may perform certain operations associated with providing dynamic bundling of programming for a subscription television service. Analysis server 300 may perform these and other operations in response to processor 320 executing software instructions contained in a computer-readable medium, such as main memory 330.

The software instructions may be read into main memory 330 from another computer-readable medium, such as storage device 350, or from another device via communication interface 380. The software instructions contained in main memory 330 may cause processor 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 3 illustrates exemplary components of analysis server 300, in other implementations, analysis server 300 may include fewer, additional, different, and/or differently arranged components than those depicted in FIG. 3. In still other implementations, one or more components of analysis server 300 may perform one or more other tasks described as being performed by one or more other components of analysis server 300.

Figure 4:
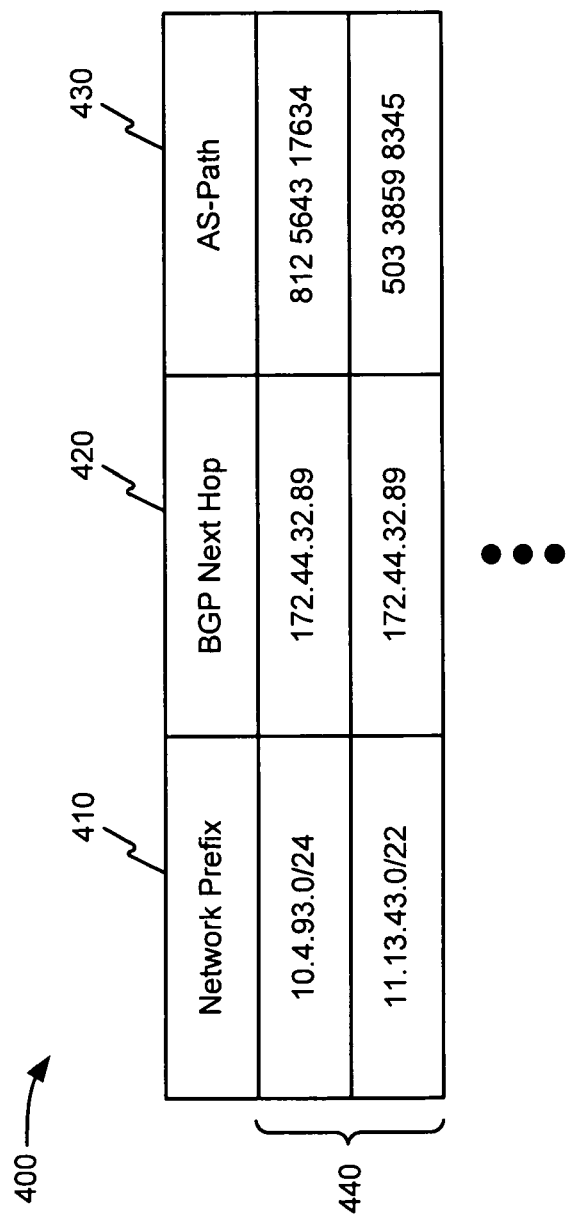
FIG. 4 illustrates an exemplary Border Gateway Protocol (BGP) routing table portion consistent with implementations described herein.

FIG. 4 illustrates an exemplary BGP routing table portion 400 consistent with implementations described herein. A BGP routing table (including BGP routing table portion 400) may be retrieved from network device 200, for example, and stored in a memory (e.g., storage device 350) accessible to analysis server 300. BGP routing table portion 400 may contain the best BGP route (based, for example, on BGP defaults and/or configured settings) for each of the network prefixes learned via BGP.

BGP routing table 400 may include a network prefix field 410, a BGP next hop address field 420, an autonomous system (AS) path field 430, and/or a variety of entries 440 associated with fields 410-430. The network prefix field 410 may store network prefixes that identify, for example, an aggregation of network gateways or an individual gateway. The BGP next hop address field 420 may store addresses of external BGP neighbors that advertise the prefixes in the network prefix field 410. The autonomous system (AS) path field 430 may store sequences of autonomous systems that particular data packets need to traverse in order to reach their final destination networks. For example, as shown in the first row of data in BGP routing table 400, a sequence may be represented by 812 5643 17634, where each group of numbers (e.g., 812) may identify an autonomous system. In order to reach the destination network, therefore, the data packet may need to travel through autonomous system 812, then through autonomous system 5643, and finally through autonomous system 17634.

Although FIG. 4 shows exemplary information that may be provided in BGP routing table portion 400, in other implementations, BGP routing table portion 400 may contain less, different, differently arranged, or additional information than depicted in FIG. 4.

Figure 5:
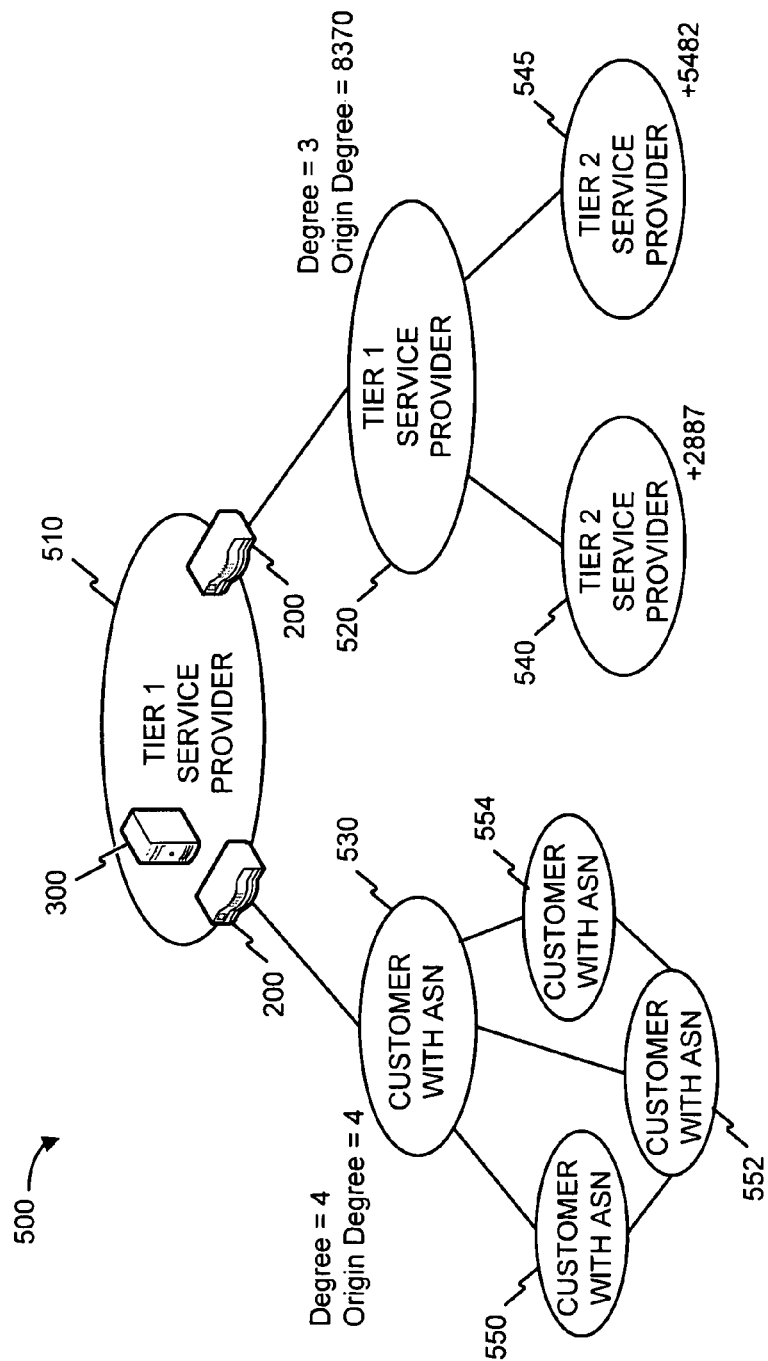
FIG. 5 is an exemplary network portion that illustrates a connectedness analysis of a next hop autonomous system with subsequent autonomous systems in an AS-path.

FIG. 5 provides an exemplary network portion 500 that illustrates a connectedness analysis of a next hop autonomous system with subsequent autonomous systems in an AS-path. Network portion 500 may include a tier one ISP 510 connected (via one or more network devices 200) to an adjacent tier one ISP 520 and an adjacent customer 530 with an ASN. Tier one ISP 520 may also be connected to tier two ISPs 540 and 545, while customer 530 may also be connected to customers 550, 552, and 554. Tier one ISPs 510, 520 and tier two ISPs 540, 545 may be similar to tier one ISP 110 and tier two ISP 140 described above with respect to FIG. 1. Customers 530, 550, 552, and 554 may be similar to customers 170 and 172 described above with respect to FIG. 1. Analysis server 300 in ISP 110 may be used to determine connectedness of adjacent ISP 520 and customer 530. Connectedness of an autonomous system may be determined using, for example, BGP table entries collected from BGP speakers, directly connected neighbors, a percentage of total AS-paths the ASN appears in, or the total size of all advertised prefixes.

In an exemplary implementation, an origin degree may be used to determine connectedness. As used herein, the term "origin degree" may be the number of distinct originating ASNs for all BGP table entries from a particular adjacent ASN. Origin degree analysis may utilize the fact that BGP announces only "best" paths to look at the total reachable AS endpoints through paths announced from a particular neighbor. The origin degree, which may be determined by aggregating all BGP paths, allows a system (e.g., analysis server 300) to walk through each AS-path, comparing the origin degree of the first adjacent ASN to the subsequent origin degrees of each hop in the AS-path. A suspicion score may be built additively using the percentage increase in the origin degree of subsequent hops over the first adjacent ASN.

Referring to FIG. 5, ISP 510 may identify the origin degree for adjacent ISP 520 and adjacent customer 530. ISP 520 may have direct connections to ISP 510, ISP 540 and ISP 545, yielding under traditional graph theory, a degree of 3. Customer 530 may have direct connections to ISP 510, customer 550, customer 552, and customer 554, yielding under traditional graph theory, a degree of 4. Applying origin degree analysis to ISP 520, the number of distinct origins in BGP table entries may be 2,887 for ISP 540, 5,482 for ISP 545, and 1 for ISP 510. Thus, the cumulative origin degree for ISP 520 would be 8,370. Applying origin degree analysis to customer 530, the number of distinct origins in BGP table entries may be 1 for each of customers 550, 552, and 554, and 1 for ISP 510 (which would be expected, since the customers 530, 550, 552, and 554 are not service providers). Thus, the cumulative origin degree for customer 530 would be 4. In exemplary implementations, the origin degree for an adjacent AS (e.g., ISP 520) may be de-duplicated to avoid redundant origins from each subsequent AS (e.g., ISPs 540 and 545).

Figure 6:
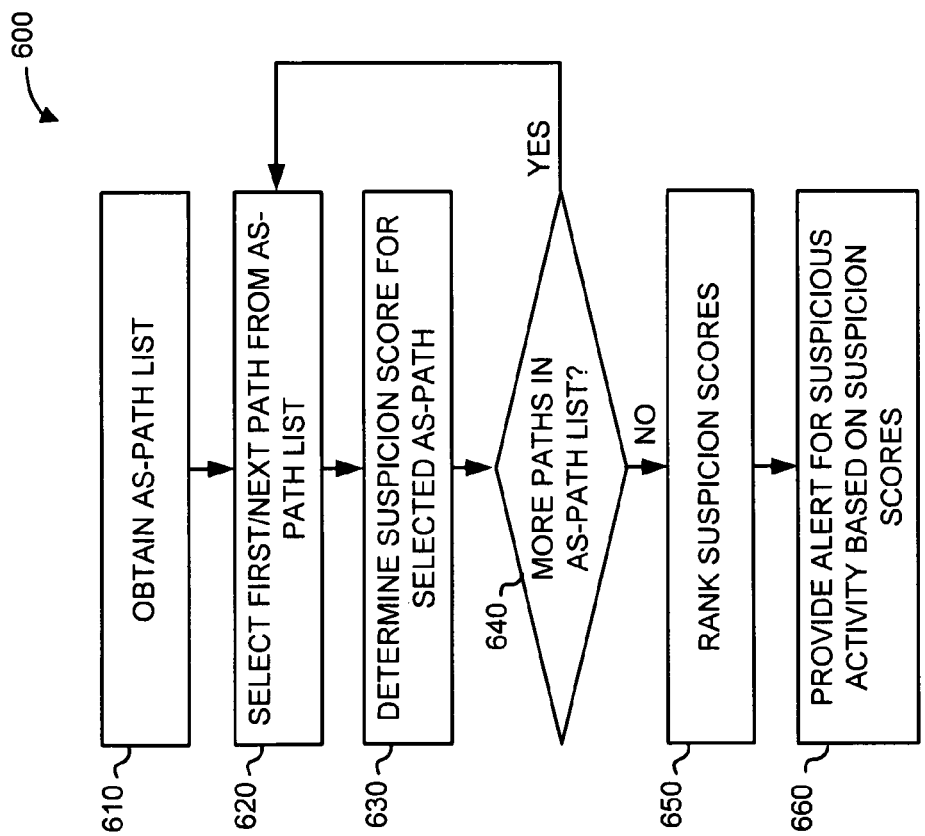
FIG. 6 is a flow chart of an exemplary process for determining a suspicious AS-path.

FIG. 6 depicts a flow chart of an exemplary process 600 for determining a suspicious AS-path. In one implementation, process 600 may be performed by one or more devices associated with an ASN, such as network device 200 and/or analysis server 300. In another implementation, some or all of process 600 may be performed by another device or group of devices, including or excluding network device 200 and/or analysis server 300.

Process 600 may begin with obtaining an AS-path list (block 610) and selecting a first or next path from the AS-path list (block 620). For example, analysis server 300 may collect BGP routing table information from one or more routers associated with the ASN. In one implementation, BGP routing table information may be obtained using a routing software suite, such as QUAGGA™ In other implementations, a dedicated state machine may be used to collect and/or analyze BGP routing table information. The routing table information may include a "best" AS-path for a multiple network prefixes. In one implementation, the AS-path list may include all AS-paths that transit the ASN. Analysis server 300 may select a particular path to analyze and proceed in sequence through each path on the list. In another implementation, two or more paths may be analyzed in parallel.

A suspicion score for the selected AS-path may be determined (block 630). For example, analysis server 300 may determine a suspicion score for the selected path based on the connectedness of the path. Determining a suspicion score is described in more detail with respect to FIG. 7.

It may be determined if there are more paths in the AS-path list (block 640). For example, analysis server 300 may determine if suspicion scores for all paths in the AS-path list have been calculated. If there are more paths to analyze in the AS-path list (block 640—YES), process 600 may return to block 620 to select the next path from the AS-path list.

If there are no more paths in the AS-path list (block 640—NO), the suspicion scores may be ranked (block 650). For example, analysis server 300 may rank the suspicion scores to identify the most-likely suspicious paths. Thus, the suspicion score may provide a relative ranking of suspicious AS-paths. In another implementation, a particular suspicion score threshold (e.g., any suspicion score with a positive value) may be used to determine a suspicious AS-path.

An alert may be provided for suspicious activity based on the suspicion scores (block 660). For example, analysis server 300 may provide an automated message to an operator at the AS associated with analysis server 300 to indicate the suspicious AS-path. In one implementation, the automated message may include, for example, the AS-path route and the time the path was created. In another implementation, analysis server 300 may provide an automated message to a potential victim of the suspicious AS-path. In still another implementation, analysis server 300 may provided instructions to a network device (e.g., network device 200) to block service on the suspicious AS-path.

Figure 7:
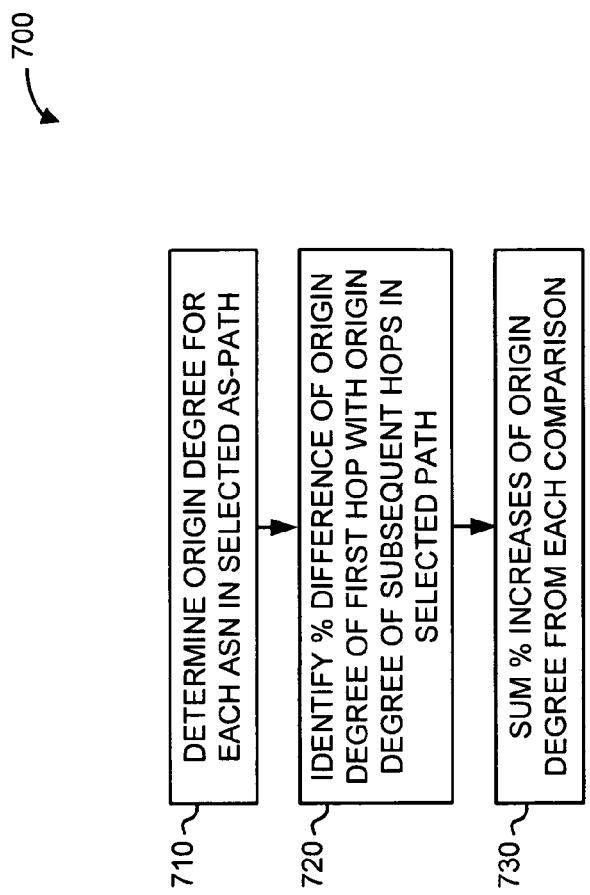
FIG. 7 is a flow chart illustrating exemplary operations to determine a suspicion score for an AS-path.

FIG. 7 provides a flow chart illustrating exemplary process 700 to determine a suspicion score for an AS-path (e.g., block 620 of FIG. 6). In one implementation, the process 700 may be performed by one or more devices associated with an ASN, such analysis server 300. In another implementation, some or all of process 700 may be performed by another device or group of devices, including or excluding analysis server 300.

An origin degree may be determined for each ASN in a selected AS-path (block 710). For example, analysis server 300 may collect BGP table information from directly connected ASNs. Additionally and/or alternatively, analysis server 300 may analyze other/all downstream paths to build an origin degree for non-connected ASNs. Additionally, external BGP data could be used for building the origin degree score for non-connected ASNs. External data may be collected, for example, from other sources that allow Internet users to view BGP routing information from the perspective of other locations around the Internet, such as data from the Route Views project at the University of Oregon. Analysis server 300 may retrieve the BGP table information and/or other AS-path information to identify the number of unique origin ASNs included in table entries for each hop (or each hop for which data is available) in the selected AS-path.

For example, referring to FIG. 1, ISP 110 (using, e.g., analysis server 300 of FIG. 3) may determine an origin degree for suspicious path 195 by directly obtaining BGP routing table information from customer 172 and ISP 140. ISP 110 may also obtain BGP routing information indirectly for ISP 150 and/or customer 178, from external data, if available. ISP 110 may then identify the number of unique origin ASNs from the AS-path list associated with each ASN (i.e., customer 172, ISP 140, ISP 150, and customer 178) in suspicious path 195. The origin degree may be represented as the number of unique origin ASNs for customer 172, ISP 140, ISP 150, and customer 178, respectively. In another implementation, only origin degrees that can be directly calculated may be considered in process 700. Thus, ASNs in the selected AS-path that do not have directly calculable origin degree would not be calculated (or factored in the suspicion score described with respect to block 730 below).

Referring back to FIG. 7, a percentage difference of the origin degree of a first hop with the origin degree of subsequent hops in the selected path may be identified (block 720). For example, analysis server 300 may compare the origin degree of the first adjacent ASN in the selected AS-path with each subsequent ASN in the AS-path. Referring again to suspicious path 195 of FIG. 1, ISP 110 may compare the origin degree of customer 172 with the origin degree of ISP 140, ISP 150, and customer 178.

Percentage increase of the origin degree for each comparison may be summed (block 730). For example, analysis server 300 may add up the percentage increase values determined by comparing the first hop origin degree with each of the subsequent hops. A percentage increase value may be realized when the origin score for a subsequent hop is greater than the origin value of the first hop. When adding up the percentage increase values, negative (e.g., percentage decrease) or zero values (e.g., where the origin score for a next hop is less than or equal to that of the first hop) may be ignored. The sum of the percentage increase values may become the suspicion score. Thus, the suspicion score may provide a relative indication of the degree of suspicion of an AS-path. For example, a suspicion score of less than 0.1 (e.g., indicating the origin degree of one or more subsequent hops was only marginally larger than the origin degree for the next hop AS) may indicate a relatively small likelihood of suspicion. Conversely, a suspicion score of over 100 (e.g., indicating the origin degree of one or more subsequent hops was much larger than the origin degree for the next hop AS) may indicate a strong likelihood of a hijacked or improperly-routed AS-path.

As an example, assume for the suspicious path 195 of FIG. 1 that the origin degree of customer 172 is 36, the origin degree of ISP 140 is 3040, the origin degree of ISP 150 is 28, and the origin degree of customer 178 is 26. The percent increase for ISP 140 (would be counted toward the suspicion score, while the percent difference for ISP 150 and customer 178 would be ignored.

Systems and/or methods described herein may analyze backbone BGP data collected from either an internal BGP speaker, or through externally aggregated BGP data to determine unlikely AS-paths through a comparative analysis of the connectedness of each autonomous system in the AS-path.

The connectedness of each autonomous system in the AS-path can be based on derived origin degrees as accumulated and calculated from all connected BGP speakers. In an exemplary implementation, an ISP may determine the origin degree by retrieve a list of AS-paths from each neighboring ASN and identifying the unique origins in each AS-path to achieve a total number of unique origins. The origin degree may be used to determine a suspicion score that provides a basis for ranking of suspicious AS-paths.

Thus, systems and/or methods described herein may provide a way for an ISP to determine if an AS-path is flowing through a suspicious or unlikely path. The systems and/or methods can also provide an alert for inadvertent or mistaken AS-path announcements by service providers or customers that end up causing the customers (that pay for transit) to transit for ASN peers (which do not pay for transit).

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, in one implementation, mistaken BGP announcements can be further differentiated from deliberately malicious hijacks by analyzing how the unlikely path won the BGP best path selection. For AS-paths identified as suspicious, analysis server 300 could, for example, attempt to identify more rational AS-paths that would conform to BGP policies. The identification of an existing superprefix (e.g., a less specific network prefix than the network prefix used in a suspicious path) or lower multi-exit discriminator (MED) values for equal AS-path lengths in BGP table entries could further point toward deliberate hijacking.

Also, while series of blocks have been described with regard to the flowcharts of FIGS. 6 and 7, the order of the blocks may differ in other implementations. Further, non-dependent acts may be performed in parallel. For example, in one implementation, origin degrees may be determined for all autonomous systems in all AS-paths prior to conducting any comparative analyses.

It will be apparent that implementations, as described herein, may be implemented in many different forms of software, firmware, and hardware in the implementations illustrated in the figures. The actual software code or specialized control hardware used to implement embodiments described herein is not limiting of the disclosure of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A computing-device implemented method, comprising:
   obtaining, by a processor and from a Border Gateway Protocol (BGP) speaker, a list of autonomous system paths (AS-paths);
   selecting, by the processor, an AS-path from the list of AS-paths;
   determining, by the processor, a suspicion score for the AS-path, the suspicion score being based on a comparative analysis of connectedness of each autonomous system in the AS-path, the determining including:
      determining an origin degree for each autonomous system in the AS-path;
      comparing the origin degree of a first adjacent autonomous system in the AS-path with each subsequent autonomous system in the AS-path; and
      summing percentage increase values determined by comparing the origin degree of the first adjacent autonomous system in the AS-path with each subsequent autonomous system in the AS-path;
   comparing, by the processor, the suspicion score to a threshold value; and
   providing, by the processor, an indication that the AS-path is a suspicious AS-path when the suspicion score exceeds the threshold value.

2. The method of claim 1, where the list of AS-paths includes information from a BGP routing table, and where the method further comprises:
   storing, in a memory accessible by the computing device, the list of AS-paths.

3. The method of claim 1, where the connectedness of each autonomous system in the AS-path is based on an origin degree for each autonomous system, the origin degree comprising a total number of distinct originating autonomous system numbers (ASNs) for all BGP table entries for a the autonomous system.

4. The method of claim 1, where, when summing the percentage increase values, percentage decrease values and zero values are excluded.

5. The method of claim 1, where the suspicion score provides a relative indication of a level of suspicion for the AS-path.

6. The method of claim 1, where the indication of the suspicious AS-path comprises an automatically generated message to an operator associated with the computing device.

7. The method of claim 1, where the indication of the suspicious AS-path comprises an automatically generated message to an operator associated with a last hop autonomous system in the AS-path.

8. The method of claim 1, where each of the AS-paths in the list of AS-paths includes an autonomous system number (ASN) for a particular autonomous system associated with a service provider.

9. A device comprising:
   a memory to store instructions and an autonomous system path (AS-path); and
   a processor to execute the instructions in the memory to:
      determine an origin degree for each autonomous system in the AS-path,
      compare the origin degree of a first adjacent autonomous system in the AS-path with each subsequent autonomous system in the AS-path, sum percentage increase values determined by comparing the origin degree of the first adjacent autonomous system in the AS-path with each subsequent autonomous system in the AS-path to determine a suspicion score for the AS-path, compare the suspicion score to a threshold value, and provide an indication of a suspicious AS-path when the suspicion score exceeds the threshold value.

10. The device of claim 9, where the AS-path includes a plurality of autonomous system numbers (ASNs) forming a route from a service provider operating the system.

11. The device of claim 9, where the suspicious AS-path indication comprises an automatically generated message to a network device associated with a service provider.

12. The device of claim 9, where the processor further executes instructions in the memory to:

obtain, from a network device utilizing Border Gateway Protocol (BGP), a list of autonomous system paths (AS-paths) that include an autonomous system number (ASN) for a particular autonomous system; and select the AS-path from the list of AS-paths.

13. The device of claim 9, where percentage decrease values and zero values determined by comparing the origin degree of the first adjacent autonomous system in the AS-path with each subsequent autonomous system in the AS-path are excluded when summing the percentage increase values.

14. The device of claim 9, where the suspicion score provides a relative indication of a level of suspicion for the AS-path.

15. A method, comprising:

obtaining, by a server device from a network device implementing Border Gateway Protocol (BGP), a list of autonomous system paths (AS-paths), where each AS-path in the list of AS-paths includes an autonomous system number (ASN) for a particular service provider;

determining, by the server device, an origin degree for each autonomous system in each of the AS-paths;

comparing, by the server device, the origin degree of each first hop autonomous system in each AS-path with each subsequent hop autonomous system in the same AS-path;

determining a suspicion score for each AS-path in the list of AS-paths based on the comparing, the determining including:

comparing the origin degree of a first adjacent autonomous system in the AS-path with each subsequent autonomous system in the AS-path; and summing percentage increase values determined by comparing the origin degree of the first adjacent autonomous system in the AS-path with each subsequent autonomous system in the AS-path; and alerting the particular service provider of a suspicious AS-path when one of the suspicion scores exceeds a threshold value.

16. The method of claim 15, where each of the suspicion scores provides a relative indication of a level of suspicion for each AS-path.

17. A system, comprising:

one or more devices to execute instructions, stored in a memory, to:

determine connectedness for each autonomous system in an AS-path, where the connectedness of each autonomous system in the AS-path is based on an origin degree for each autonomous system, the origin degree comprising a total number of distinct originating autonomous system numbers (ASNs) for Border Gateway Protocol (BGP) table entries for a particular autonomous system;

determine a suspicion score based on the connectedness, the one or more devices, when determining the suspicion score, being further to:

determine an origin degree for each autonomous system in the AS-path;

compare the origin degree of a first adjacent autonomous system in the AS-path with each subsequent autonomous system in the AS-path; and sum percentage increase values determined by comparing the origin degree of the first adjacent autonomous system in the AS-path with each subsequent autonomous system in the AS-path; and provide an indication of a suspicious AS-path if the suspicion score exceeds a threshold value.

18. The system of claim 17, where the one or more devices are further to execute instructions to:

block data traffic over the AS-path if the suspicion score exceeds the threshold value.

19. The system of claim 17, where the indication of the suspicious AS-path comprises an automatically generated message to an operator associated with one of the one or more devices.

20. The system of claim 17, where the one or more devices are further to execute instructions to:

exclude percentage decrease values and zero values when summing the percentage increase values.

* * * * *